United States Patent
Iwaki et al.

(10) Patent No.: US 9,906,113 B2
(45) Date of Patent: Feb. 27, 2018

(54) LINEAR ACTUATOR (71) Applicant: THK CO., LTD., Tokyo (JP)

(72) Inventors: Junichiro Iwaki, Tokyo (JP); Takashi Ogata, Tokyo (JP)

(73) Assignee: THK CO., LTD., Tokyo (JP)

( * ) Notice: Subject to any disclaimer, the term of this patent is extended or adjusted under 35 U.S.C. 154(b) by 313 days.

(21) Appl. No.: 14/896,083

(22) PCT Filed: May 2, 2014

(86) PCT No.: PCT/JP2014/062150
§ 371 (c)(1),
(2) Date: Dec. 4, 2015

(87) PCT Pub. No.: WO2014/196298
PCT Pub. Date: Dec. 11, 2014

(65) Prior Publication Data
US 2016/0126821 A1 May 5, 2016

(30) Foreign Application Priority Data

Jun. 5, 2013 (JP) .................. 2013-118492

(51) Int. Cl.
*H02K 41/03* (2006.01)
*H02K 41/035* (2006.01)
(Continued)

(52) U.S. Cl.
CPC .......... *H02K 41/0352* (2013.01); *H02K 7/08* (2013.01); *H02K 33/16* (2013.01); *H02K 41/0356* (2013.01)

(58) Field of Classification Search
CPC ............... H02K 41/0352; H02K 33/16; H02K 41/0356; H02K 7/08
See application file for complete search history.

(56) References Cited

U.S. PATENT DOCUMENTS 5,434,549 A * 7/1995 Hirabayashi ........... H02K 33/00
335/229
6,184,597 B1 2/2001 Yamamoto et al.
(Continued)

FOREIGN PATENT DOCUMENTS

CN 102971947 A 3/2013
JP 61-106058 A 5/1986
(Continued)

OTHER PUBLICATIONS

Office Action dated Mar. 28, 2017, issued in counterpart Chinese Application No. 201480031855.9, with English translation. (10 pages).

(Continued)

*Primary Examiner* — Robert W Horn
(74) *Attorney, Agent, or Firm* — Westerman, Hattori, Daniels & Adrian, LLP (57) ABSTRACT

Provided is a linear actuator whose entire length can be shortened while thrust thereof can be made large. The linear actuator of the present invention is provided with the following: a hollow drive magnet (11); a coil (4) disposed at either the outside or the inside of the drive magnet (11); and a return magnet (8) that is disposed at the other of the outside or the inside of the drive magnet (11), is connected to the coil (4), and returns the drive magnet (11) to the starting point. By conducting electricity to the coil (4), the drive magnet (11) or the coil (4) and the return magnet (8) move in the axial direction of the drive magnet 11.

8 Claims, 6 Drawing Sheets (51) Int. Cl.
*H02K 33/16* (2006.01)
*H02K 7/08* (2006.01)

(56) References Cited

U.S. PATENT DOCUMENTS

| | | | | |
|---|---|---|---|---|
| 6,326,706 | B1* | 12/2001 | Zhang | F04B 35/045 310/12.24 |
| 6,501,357 | B2* | 12/2002 | Petro | H01F 7/13 310/17 |
| 7,449,803 | B2* | 11/2008 | Sahyoun | H02K 33/16 310/14 |
| 7,768,160 | B1* | 8/2010 | Sahyoun | H02K 33/16 310/14 |
| 8,018,105 | B2* | 9/2011 | Erixon | H02K 33/16 310/12.31 |
| 8,643,228 | B2* | 2/2014 | Vogel | H02K 41/031 310/12.24 |
| 8,922,069 | B2* | 12/2014 | Iwaki | H02K 33/16 310/14 |
| 9,695,806 | B2* | 7/2017 | Van Brunt | F04B 17/04 |
| 9,755,491 | B2* | 9/2017 | Takahashi | H02K 33/16 |
| 2012/0025635 | A1 | 2/2012 | Iwaki | |
| 2013/0169071 | A1 | 7/2013 | Endo et al. | |
| 2016/0126821 | A1* | 5/2016 | Iwaki | H02K 33/16 310/12.21 |

FOREIGN PATENT DOCUMENTS

| | | |
|---|---|---|
| JP | 7-39268 U | 7/1995 |
| JP | 11-197601 A | 7/1999 |
| JP | 11-313476 A | 11/1999 |
| JP | 2010-268672 A | 11/2010 |

OTHER PUBLICATIONS

International Search Report dated Jun. 10, 2014, issued in counterpart International Application No. PCT/JP2014/062150 (2 pages).

* cited by examiner

LINEAR ACTUATOR

TECHNICAL FIELD

The present invention relates to a linear actuator provided with a coil and a drive magnet generating a magnetic flux which interlinks across the coil, and by conducting electricity to the coil, either the coil or the drive magnet moves in the axial direction.

BACKGROUND ART

A linear actuator is provided with a coil and a drive magnet generating a magnetic flux which interlinks across the coil. As this type of linear actuator, the applicant has proposed a linear vibration actuator disclosed in parent literature 1.

This linear vibration actuator is provided with a cylindrical drive magnet magnetized in the axial direction and a coil disposed coaxially with the drive magnet so as to encircle the drive magnet. A magnetic flux generated by the drive magnet interlinks across the coil. By conducting electricity to the coil, either the coil or the drive magnet moves in the axial direction due to interaction between the magnetic flux of the drive magnet and the current flowing through the coil, thus making it possible to move. By switching the directions of the current flowing through the coil, that is, by supplying alternating current to the coil, the drive magnet vibrates in the axial direction.

At both axial ends of the coil, a pair of return magnets are arranged, which are for returning a mover to the starring point. The pair of return magnets repel the drive magnet of the mover so that the mover returns to the starting point due to the repelling force. With use of the repelling force of the magnet, it is possible to return the mover to the starting point without employing an elastic member such as a spring.

CITATION LIST

Patent Literature

Patent Literature 1: Japanese Patent Application Laid-open No. 2010-268672

SUMMARY OF THE INVENTION

Technical Problem

However, in the linear actuator set forth in the patent literature 1, since the coil and the return magnet are disposed in series in the axial direction of the stator, there is a problem that the entire axial length of the linear actuator is long. In some devices in which the linear actuator is incorporated, there is a demand for shortening the overall axial length of the linear actuator. The linear actuator may be shortened in its overall axial length if the axial lengths of the coil, the drive magnet and the return magnet are shortened. However, in such a structure, thrust of the linear actuator is obliged to be lowered.

In view of the foregoing, it is an object of the present invention to provide a linear actuator whose entire length can be shortened while thrust can be made large.

Solution to Problem

In order to accomplish the foregoing object, the present invention provides a linear actuator comprising: a hollow drive magnet; a coil disposed at either the outside or the inside of the drive magnet; a return magnet that is disposed at the other of the outside or the inside of the drive magnet, is connected to the coil, and returns the drive magnet to a starting point, wherein by conducting electricity to the coil, the drive magnet or the coil and the return magnet move in the axial direction of the drive magnet.

Advantageous Effects of the Invention

According to the present invention, the coil is disposed at either the outside or the inside of the hollow drive magnet, and the return magnet is disposed at the other of the outside or the inside of the hollow drive magnet. Therefore, the entire axial length of the linear actuator can be shortened while thrust can be made large. Additionally, since the hollow drive magnet is located between the coil and the return magnet, it is easy for the coil and the return magnet to apply force to the drive magnet. This is also one of the causes for making thrust large.

DESCRIPTION OF EMBODIMENTS

Figure 1:
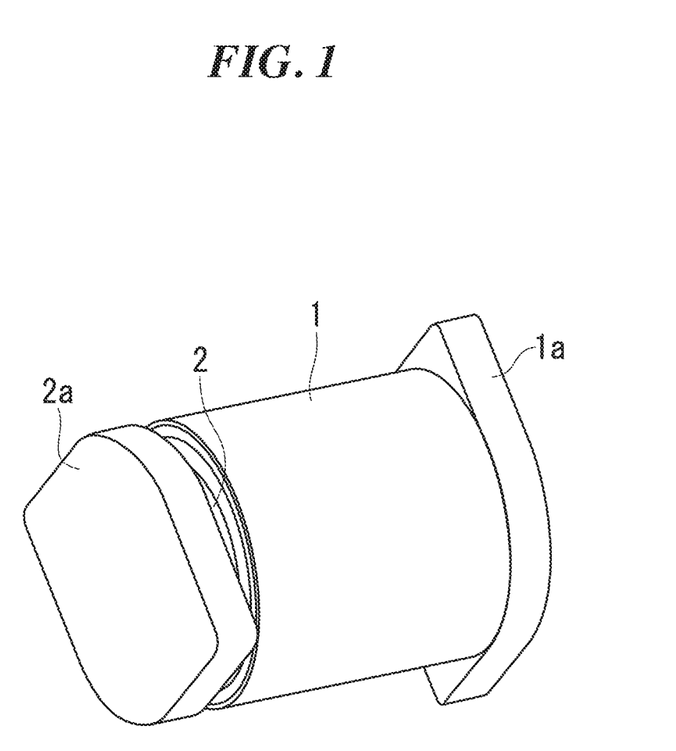
FIG. 1 is a perspective view of a linear actuator according to an embodiment of the present invention.

Referring to the accompanying drawings, a linear actuator according to an embodiment of the present invention will now be described. FIG. 1 shows a perspective view of the linear actuator. The linear actuator is provided with a cylindrical stator 1 and a cylindrical mover 2 disposed at the inside of the stator 1. Both the cylindrical stator 1 and the cylindrical mover 2 have a common axial line. The stator 1 comprises a coil. The mover 2 comprises a drive magnet. By conducting electricity to the coil of the stator 1, the mover 2 moves in the axial direction. At one end of the stator 1, a flange 1a is provided, which is for attaching the stator 1 to a device. At one end of the mover 2, a flange 2a is also provided, which is for attaching the mover 2 to another device.

Figure 2:
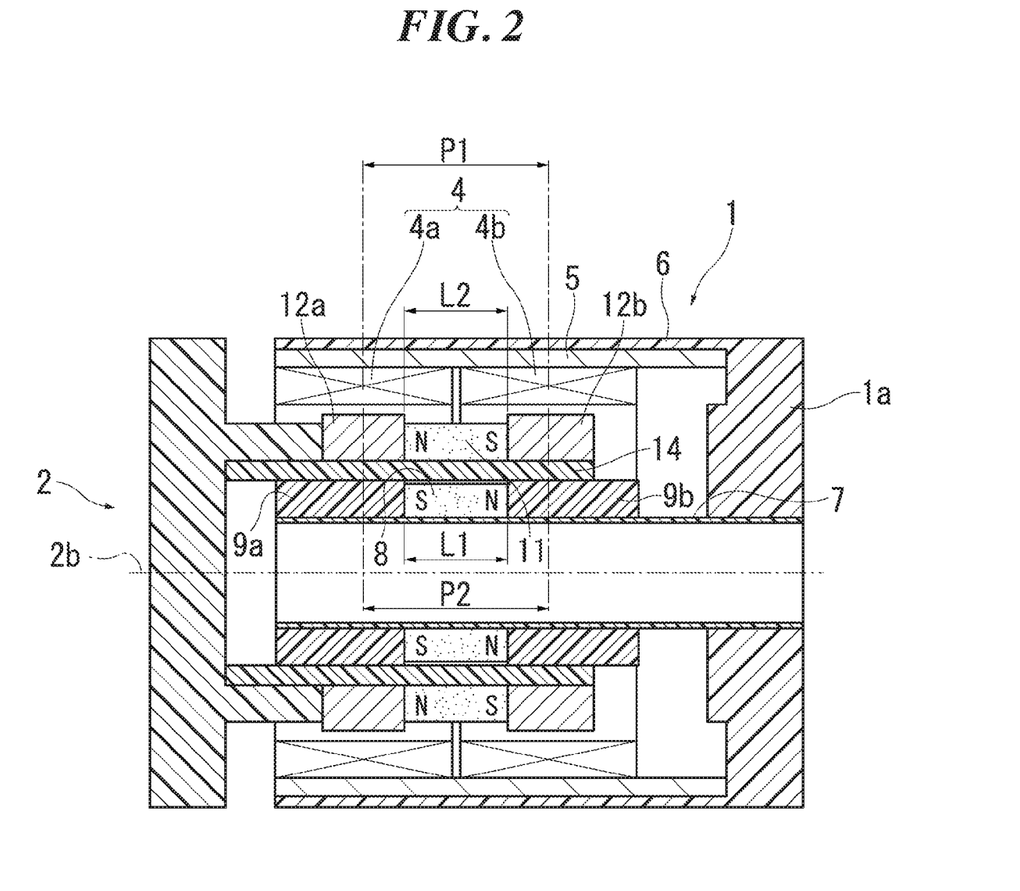
FIG. 2 is a sectional view taken along the axial line of the linear actuator according to the embodiment.

FIG. 2 shows a sectional view of the linear actuator. In the stator 1, there is provided a coil 4 consisting of first and second coils 4a and 4b, which are arranged in the axial direction to have the same axial line. At the outside of the first and second coils 4a and 4b, a cylindrical yoke 5 is disposed. The yoke 5 is made of a soft magnetic material, such as iron, steel, silicon steel, or permalloy. At the outside of the yoke 5, a cylindrical resin-made case 6 is disposed. The yoke 5 and the case 6 have axial ends, which are attached to the flange 1a. It is to be noted, if the yoke 5 is subjected to rustproofing, it is not required to provide the resin-made case 6. The coil 4 is supported by a not-shown bobbin or the like so that the coil 4 is integrated with the yoke 5 and the case 6.

A hollow pipe 7 is fixed to the flange 1*a* such that the pipe 7 passes through the inner spaces of the first and second coils 4*a* and 4*b*. The pipe 7 is made of a non-magnetic material such as resin. On the outer circumferential surface of the pipe 7, a cylindrical return magnet 8 is mounted. That is, the return magnet 8 is coupled with the first and second coils 4*a* and 4*b* via the pipe 7, the flange 1*a* and the yoke 5.

The return magnet 8 is magnetized in the axial direction so that the return magnet 8 has an S pole at one end thereof in the axial direction and has an N pole at the other end thereof in the axial direction. The return magnet 8 is disposed, in the axial direction, at a center of the coil 4 comprised of the first and second coils 4*a* and 4*b*. The axial length of the return magnet 8 is shorter than the axial length of the coil 4 comprised of the first and second coils 4*a* and 4*b*. At both axial ends of the return magnet 8, there are provided cylindrical magnet supporters 9*a* and 9*b* which are made of non-magnetic material such as resin.

The mover 2 is configured as follows. The mover 2 comprises a cylindrical drive magnet 11. The drive magnet 11 is magnetized in the axial direction so that the drive magnet 11 has an N pole at one end thereof in the axial direction and has an S pole at the other end thereof in the axial direction. The drive magnet 11 is positioned at a center of the return magnet 8 in the axial direction. The axial length L1 of the return magnet 8 is equal to or larger than the axial length L2 of the drive magnet 11, and preferably, is 1.0-1.2 times of the axial length of the drive magnet 11.

First and second yokes 12*a* and 12*b*, which are made of a soft magnetic material such as iron, steel, silicon steel, or permalloy, are provided at both ends of the drive magnet 11 in the axial direction. Both the first and second yokes 12*a* and 12*b* are cylindrical. A cylindrical sliding bearing 14 made of non-magnetic material such as resin is disposed at the inside of the drive magnet 11 and the first and second yokes 12*a* and 12*b*. The sliding bearing 14 is a bush or a spline. The inner circumferential surface of the sliding bearing 14 contacts with the outer circumferential surfaces of the magnet supporters 9*a* and 9*b* of the stator 1. Hence, the sliding bearing 14 guides the mover 2 such that the mover 2 moves linearly relative to the stator 1 in the axial direction. As a modification, the sliding bearing 14 may be made of magnetic material.

The first and second coils 4*a* and 4*b*, the drive magnet 11, the first and second yokes 12*a* and 12*b*, and the return magnet 8 are disposed as follows. The first and second coils 4*a* and 4*b* are disposed at the outside of the hollow drive magnet 11. The first and second coils 4*a* and 4*b* and the drive magnet 11 are concentrically disposed, so that the first and second coils 4*a* and 4*b* and the drive magnet 11 have an axial line which is common to each other.

The return magnet 8 is disposed at the inside of the hollow drive magnet 11. The return magnet 8 and the drive magnet 11 are concentrically disposed, so that the return magnet 8 and the drive magnet 11 have an axial line which is common to each other.

The first and second coils 4*a* and 4*b* are faced to the first and second yokes 12*a* and 12*b*, respectively. A center-to-center pitch P1 of the first and second coils 4*a* and 4*b* (i.e., a length from an axial center of the first coil 4*a* to an axial center of the second coil 4*b*) and a center-to-center pitch P2 of the first and second yokes 12*a* and 12*b* (i.e., a length from an axial center of the first yoke 12*a* to an axial center of the second yoke 12*b*) are equal to each other. The axial length of the first coil 4*a* and the axial length of the second coil 4*b* are equal to each other. The axial length of the first yoke 12*a* and the axial length of the second yoke 12*b* are equal to each other. The axial length of each of the first and second yokes 12*a* and 12*b* is equal to or smaller than the axial length of each of the first and second coils 4*a* and 4*b*.

When the first and second coils 4*a* and 4*b* are not conducted electricity, the return magnet 8 causes the mover 2 to return to the starting point shown in FIG. 2. When the mover 2 has returned to the starting point, the axial center of the drive magnet 11 and the axial center of the return magnet 8 agree with each other in the axial direction.

Figure 3:
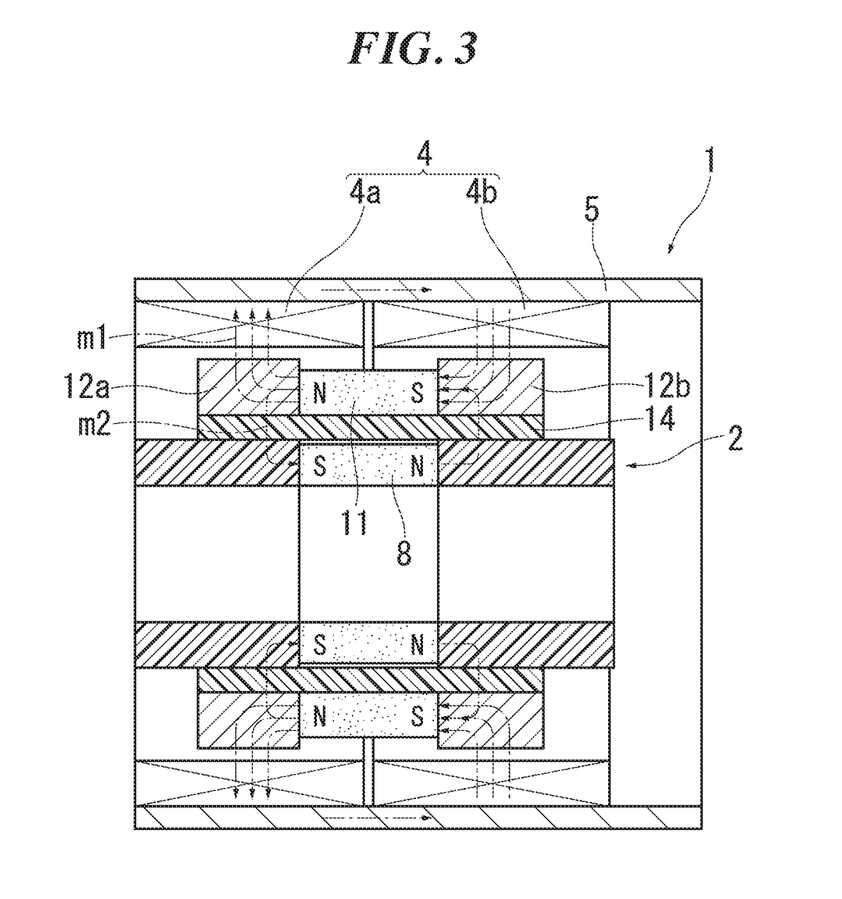
FIG. 3 is a diagrammatic sketch of the linear actuator shown in FIG. 2 (FIG. 3 shows first and second magnetic circuits of a drive magnet and a return magnet)

FIG. 3 shows first and second magnetic circuits of the drive magnet 11 and the return magnet 8. A magnetic flux generated by the N pole of the drive magnet 11 enters the first yoke 12*a*, bents at an angle of approximately 90 degrees, interlinks across the first coil 4*a*, and then enters the yoke 5 outside of the first coil 4*a*. The magnetic flux further passes through the yoke 5 in the axial direction, bents at an angle of approximately 90 degrees, interlinks across the second coil 4*b*, enters the second yoke 12*b*, and returns to the S pole of the drive magnet 11. As described, the drive magnet 11 generates a first magnetic circuit m1 interlinking across the first and second coils 4*a* and 4*b*. By conducting electricity to the first and second coils 4*a* and 4*b*, thrust is generated due to interaction between the magnetic flux of the drive magnet 11 and currents flowing through the first and second coils 4*a* and 4*b*, and the mover 2 moves in the axial direction.

By supplying alternating currents to the first and second coils 4*a* and 4*b*, the direction of thrust exerted on the mover 2 changes alternately, and the mover 2 vibrates. When the mover 2 vibrates, it is preferred that the phases of the alternating currents flowing through the first and second coils 4*a* and 4*b* are shifted 90 degrees from each other in order to make the thrust large. For example, if a sine-wave alternating current is supplied to the first coil 4*a*, it is preferred to supply a cosine-wave alternating current to the second coil 4*b*. Alternatively, a driver for a stepping motor can be used to supply an A-phase current to the first coil 4*a* and to supply a B-phase current to the second coil 4B, in which the phase of the B-phase current is shifted 90 degrees from that of the A-phase current.

The reason why the mover 2 returns to the starting point is as follows. A part of the magnetic flux generated by the N pole of the drive magnet 11 enters the S pole of the return magnet 8 after a direction change of approximately 180 degrees. A magnetic flux generated by the N pole of the return magnet 8 enters the S pole of the drive magnet 11 after a direction change of approximately 180 degrees. The drive magnet 11 and the return magnet 8 generate a second magnetic circuit m2. The N pole of the drive magnet 11 and the S pole of the return magnet 8 are attracted to each other, while the S pole of the drive magnet 11 and the N pole of the return magnet 8 are attracted to each other, so that the mover 2 returns to the starting point.

Figure 4:
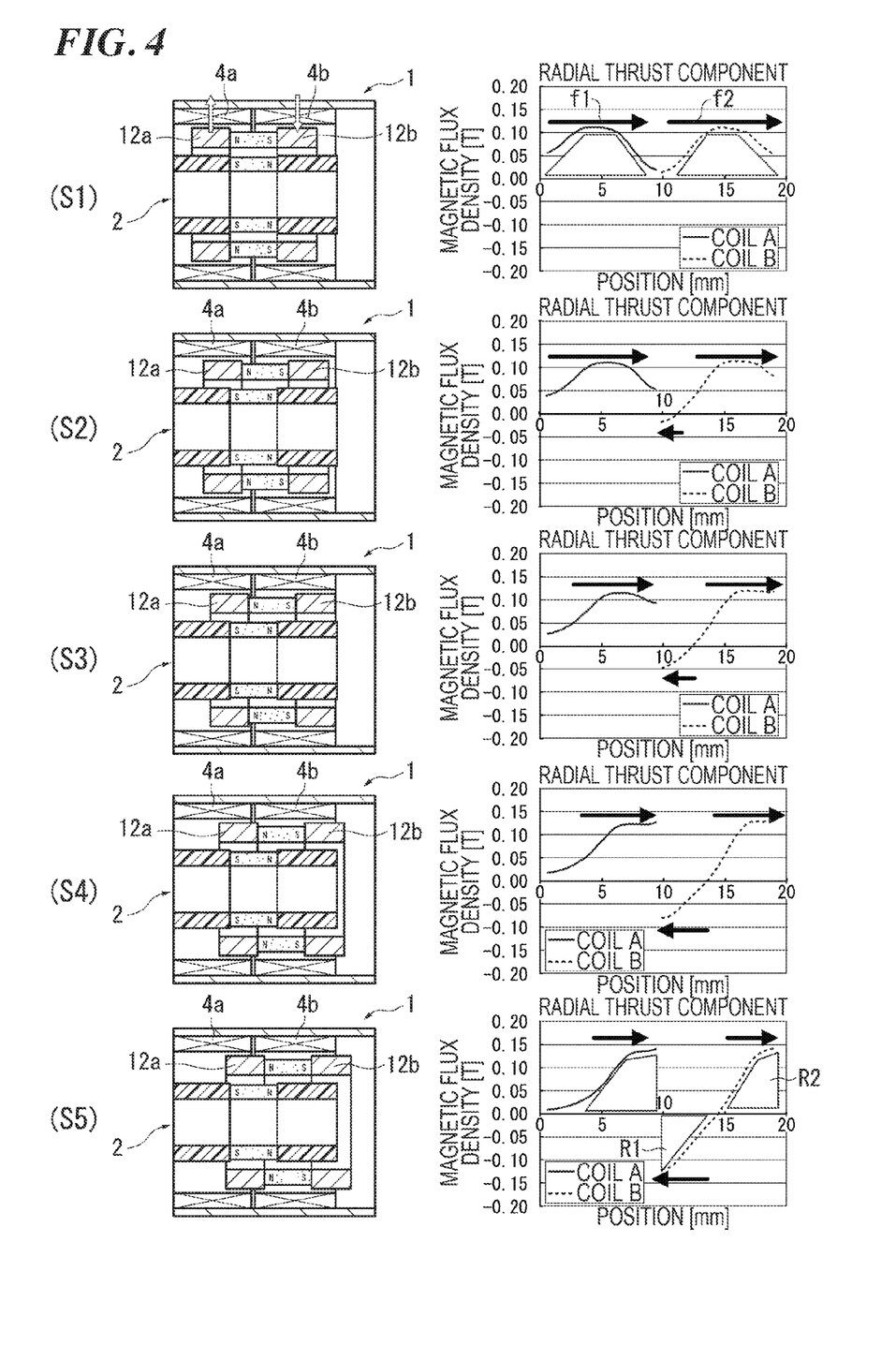
FIG. 4 illustrates changes in interlinkage magnetic fluxes at first and second coils when a mover moves from the starting point to the right end of its stroke.

FIG. 4 is a figure showing changes in interlinkage magnetic fluxes at the first and second coils 4*a* and 4*b* when the mover 2 moves from the starting point to the right end position of a stroke. The left column in FIG. 4 shows positions of the mover 2, while the right column in FIG. 4 shows interlinkage magnetic fluxes at the first and second coils 4*a* and 4*b*. A reference S1 shows a state where the mover 2 is positioned at the starting point, references S2 to S4 show states in which the mover 2 moves gradually to the right in FIG. 4, and a reference S5 shows a state where the mover 2 is positioned at the right end position of the stroke.

The right column in FIG. 4 provides graphs each showing interlinkage magnetic fluxes at the first and second coils 4a and 4b. In each graph, a range of from 0 to 10 mm shows existence of the first coil and a range of 10 to 20 mm shows existence of the second coil. The axial center of the first coil is positioned at 5 mm and the axial center of the second coil is positioned at 15 mm. In the magnetic fluxes interlinking across the first and second coils 4a and 4b, a radial flux component contributes to generation of thrust at each of the first and second coils 4a and 4b. For this reason, the graphs in FIG. 4 indicate the radial flux component of the interlinkage magnetic fluxes.

When the mover 2 is positioned at the starting point (S1), the first yoke 12a is positioned at an axial center of the first coil 4a, whilst the second yoke 12b is positioned at an axial center of the second coil 4b. At this position, the interlinkage magnetic fluxes at the first and second coils 4 and 4b become their maximums. When currents of mutually opposite directions are supplied to the first and second coils 4a and 4b, the first and second coils 4a and 4b generate two thrust components f1 and f2 in the same direction, which are shown in FIG. 4. Incidentally, in the interlinkage magnetic fluxes at the first coil 4a, an interlinkage magnetic flux oriented radially outward is shown by positive values, while in the interlinkage magnetic fluxes at the second coil 4b, an interlinkage magnetic flux oriented radially inward is shown by positive values.

As shown by the transitions S2 to S5, as the mover 2 comes closer to the right end position of the stroke, the negative-directional interlinkage magnetic flux increases at the second coil 4b. In the transition S5, the negative-directional interlinkage magnetic flux is shown by a reference R1 and the positive-directional interlinkage magnetic flux is shown by a reference R2. The interlinkage magnetic flux in this embodiment is composed of a flux component caused by the drive magnet 11 and a flux component caused by the return magnet 8. It is estimated that interference between these magnets 8 and 11 causes the negative-directional interlinkage magnetic flux increases as the mover 2 comes closer to the right end position of the stroke. This negative-directional interlinkage magnetic flux exerts a braking force on the mover 2 which has moved close to the end position of the stroke. This braking force prevents the mover 2 from jumping out of the stator 1 even when the mover 2 is forced to vibrate at higher speeds. The closer the mover 2 moves to the right end position of the stroke, the smaller the sum of the interlinkage magnetic fluxes generated by the first and second coils 4a and 4b becomes. It is estimated that this is one of the reasons for preventing the mover 2 from jumping out of the stator 1.

The linear actuator according to the present embodiment provides the following advantages. The coil 4 is disposed at the outside of the hollow drive magnet 11 and the return magnet 8 is disposed at the inside of the hollow drive magnet 11. It is thus possible to shorten the entire axial length of the linear actuator while thrust can be made large. Additionally, since the hollow drive magnet 11 is located between the coil 4 and the return magnet 8, it is easier for the coil 4 and the return magnet 8 to apply force to the drive magnet 11. This is also one of the causes for making thrust of the linear actuator large.

The drive magnet 11 is magnetized in the axial direction and the first and second yokes 12a and 12b which are made of soft magnetic material are provided at both ends of the drive magnet 11. This makes it possible to increase facing areas between the first and second coils 4a and 4b and the first and second yokes 12a and 12b, whereby a magnetic flux generated by the drive magnet 11 can be interlinked effectively across the first and second coils 4a and 4b.

The drive magnet 11 is magnetized in the axial direction and the first and second yokes 12a and 12b are provided at both axial ends of the drive magnet 11, which makes it possible that the sliding bearing 14 is disposed at the inside of the drive magnet 11. Accordingly, the radial size of the linear actuator can be reduced.

The axial length L1 of the return magnet 8 is set to be between 1.0-1.2 times of the axial length L2 of the drive magnet 11. Thus the foregoing braking force can be exerted on the mover 2 which has moved close to the end of the stroke.

The sliding bearing 14 is disposed between the return magnet 8 and the drive magnet 11, which allows the sliding bearing 14 to guide axial movements of the drive magnet 11 relative to the return magnet 8. If the sliding bearing 14 is disposed between the drive magnet 11 and the coil 4, there may occur a difficulty that a magnetic flux generated by the drive magnet 11 are prevented from being interlinked across the coil 4. However, in the present embodiment, since the sliding bearing 14 is disposed between the return magnet 8 and the drive magnet 11, the magnetic flux generated by the drive magnet 11 can be avoided from being influenced by the sliding bearing 14. Moreover, the sliding bearing 14 is made of non-magnetic material, which is also effective for avoiding the magnetic flux generated by the drive magnet 11 from being influenced by the sliding bearing 14.

The coil 4 is disposed at the outside of the drive magnet 11, resulting in that the radius of the coil 4 can be made larger, and thrust of the linear actuator can be made larger.

The mover 2 is set to have a stroke less than a length obtained by totaling the axial lengths of the drive magnet 11 and the return magnet 8. This size setting prevents the drive magnet 11 from jumping out of the return magnet 8, thus making it possible that a restoring force for returning to the starting point can be securely exerted on the drive magnet 11 from the return magnet 8.

The return magnet 8 is hollow, so that the inside of the return magnet 8 can be utilized as, for example, a space for wiring.

Incidentally, the gist of the present invention will not be restricted to the foregoing embodiment, and, without departing the spirit of the present invention, it is also possible to practice the present invention into other various embodiments.

For example, in the foregoing embodiment, the linear actuator is used as a vibration actuator in which the drive magnet is vibrated in the axial direction by conducting electricity to the coil. However, the drive magnet is positionally controlled in the axial direction without vibrating the drive magnet. This configuration is applicable to a linear actuator which is able to drive, for example, the shutter mechanism of a camera.

In the foregoing embodiment, although the coil is disposed at the outside of the hollow drive magnet and the return magnet is disposed at the inside of the hollow drive magnet, the return magnet can be disposed at the outside of the hollow-shaped drive magnet and the coil can be disposed at the inside of the hollow-shaped drive magnet.

Figure 5:
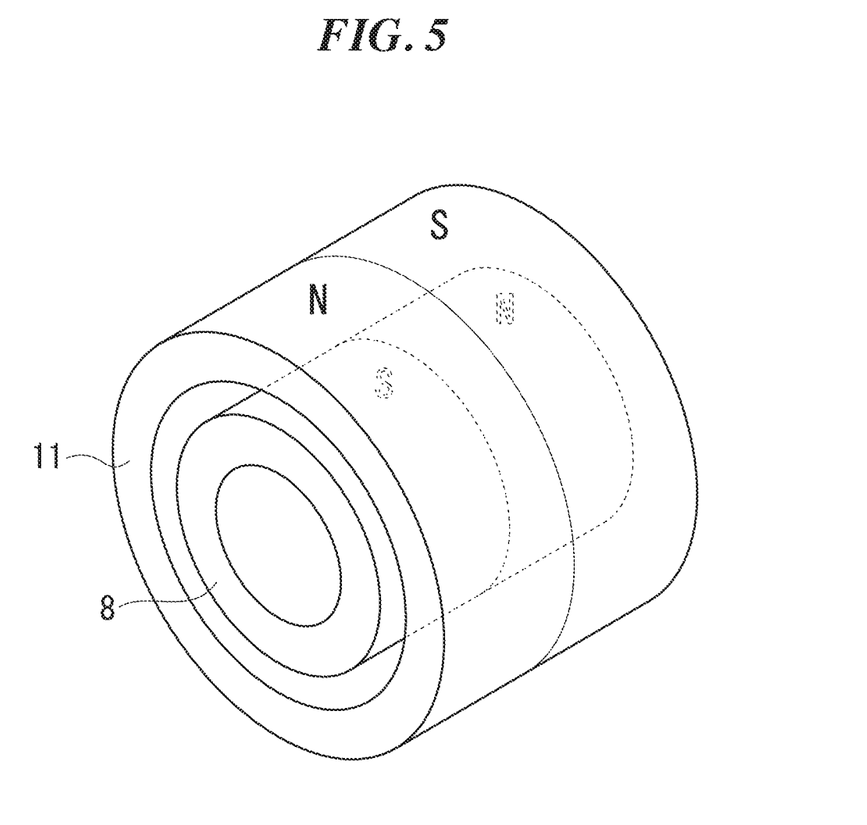
FIG. 5 is a perspective view showing another example of the drive magnet and the return magnet according to the embodiment.
Figure 6:
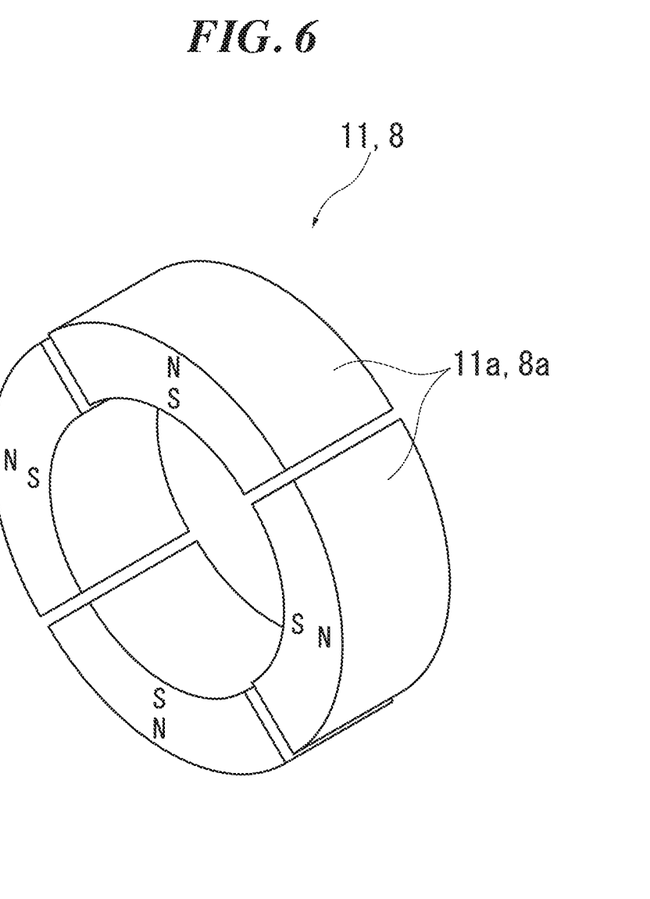
FIG. 6 is a perspective view showing an example in which the drive magnet and the return magnet according to the embodiment are provided as segment magnets.

In the foregoing embodiment, the drive magnet and the return magnet are magnetized in the axial direction, but the magnets can be magnetized in the radial direction. In such a modification, as shown in FIG. 5, an axial half of outer-circumferential surface of each of the drive magnet 11 and the return magnet 8 is magnetized as an N pole, while the other half of each of the magnets 11 and 8 is magnetized as an S pole. Alternatively, as shown in FIG. 6, each of the drive magnet 11 and the return magnet 8 can be comprised of a combination of a plurality of segment magnets 11a or 8a divided into arc-shaped pieces. In this magnet configuration, however, when the drive magnet 11 is magnetized in the radial direction, it is required to dispose a yoke, made of soft magnetic material, at the inside of the drive magnet 11, which leads to a drawback that the radial size of an actuator becomes larger.

The present specification is based on Japanese Patent Application No. 2013-118492 filed on Jun. 5, 2013, the description of which is all incorporated herein by references.

REFERENCE SIGN LIST

4 . . . coil
4a, 4b . . . first and second coils
5 . . . yoke
8 . . . return magnet
11 . . . drive magnet
12a, 12b . . . first and second yokes
14 . . . sliding bearing

The invention claimed is:

1. A linear actuator comprising:
a hollow drive magnet;
a coil disposed at either the outside or the inside of the drive magnet; and
a return magnet that is disposed at the other of the outside or the inside of the drive magnet, is connected to the coil, and returns the drive magnet to a starting point,
wherein by conducting electricity to the coil, the drive magnet or the coil and the return magnet move in an axial direction of the drive magnet, and
an N pole of the drive magnet and an S pole of the return magnet are attracted to each other, while an S pole of the drive magnet and an N pole of the return magnet are attracted to each other, and thereby returning the drive magnet to the starting point.

2. The linear actuator of claim 1, wherein
the drive magnet is magnetized in the axial direction so that the drive magnet has an N pole at one end thereof in the axial direction and has an S pole at the other end thereof in the axial direction,
first and second yokes made of soft magnetic material are provided at both ends of the drive magnet in the axial direction, and
the coil comprises a first coil faced to the first yoke and a second coil faced to the second yoke.

3. The linear actuator of claim 1, wherein a length of the return magnet in the axial direction is equal to or larger than a length of the drive magnet in the axial direction.

4. The linear actuator of claim 2, wherein the linear actuator comprises a sliding bearing disposed between the return magnet and the drive magnet, the sliding bearing guiding the drive magnet such that the drive magnet moves in the axial direction relative to the return magnet.

5. The linear actuator of claim 1, wherein the coil is disposed at the outside of the drive magnet and the return magnet is disposed at the inside of the drive magnet.

6. The linear actuator of claim 5, wherein the return magnet is hollow.

7. The linear actuator of claim 2, wherein a length of the return magnet in the axial direction is equal to or larger than a length of the drive magnet in the axial direction.

8. The linear actuator of claim 2, wherein the coil is disposed at the outside of the drive magnet and the return magnet is disposed at the inside of the drive magnet.

\* \* \* \* \*